July 12, 1949.  R. S. SANFORD  2,475,723
FLUID PRESSURE CONTROL MECHANISM
Filed Feb. 5, 1945
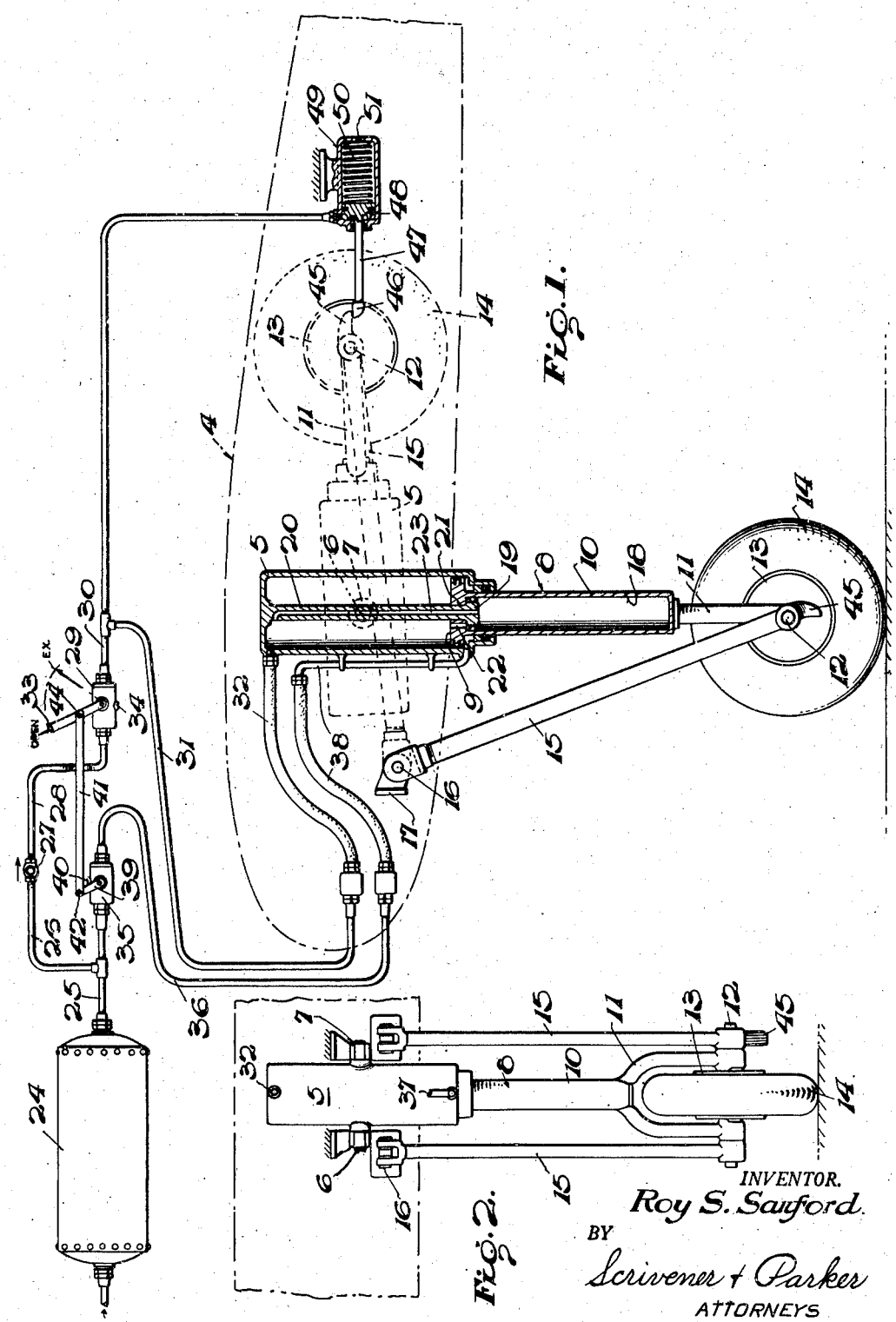
INVENTOR.
Roy S. Sanford.
BY
Scrivener & Parker
ATTORNEYS Patented July 12, 1949

2,475,723

UNITED STATES PATENT OFFICE 2,475,723

FLUID PRESSURE CONTROL MECHANISM

Roy S. Sanford, Woodbury, Conn., assignor to Bendix-Westinghouse Automotive Air Brake Company, Elyria, Ohio, a corporation of Delaware Application February 5, 1945, Serial No. 576,248

1 Claim. (Cl. 244—102)

The present invention relates to vehicle landing gears and more particularly to a combined shock absorbing and retractible landing gear for use on airplanes.

Retractible landing gears provided with shock absorbers of various types have been in common use on airplanes for some time, but most of these mechanisms have required the use of a separate power or manually operable retracting device in order to retract the landing gear when the airplane is in flight, and is accordingly an object of the present invention to provide means for eliminating the necessity for the use of such additional retracting devices.

Another object of the invention is to provide, in connection with landing gear of the above type, a shock absorber so constituted as to permit the latter to act also as a retracting device for the wheels or the ground engaging device carried by the landing gear.

Yet another object of the invention is to provide, in a mechanism of the above type, means for guiding the various parts of the mechanism so constituted as to properly guide the parts during shock absorbing action of the shock absorber, and at the same time to insure movement of all of the extended parts to a position substantially horizontal to or within the frame work of the airplane when the landing gear is fully retracted.

A still further object of the invention is to provide, in a landing gear of the above type, a pneumatic shock absorber supplied with fluid pressure from a suitable source on the airplane, so constituted as to be controllable by the operator to provide a shock absorber action, or to provide for complete retraction of the landing gear within the frame work of the airplane.

Another object is to provide means for automatically retaining the landing gear in retracted position, and for releasing the retaining means at the will of the operator.

A further object of the invention is to provide simple and efficient means for maintaining the wheel or ground engaging device of the landing gear in proper alignment at all times with the frame work of the vehicle.

Other objects and features of novelty will be apparent from the following description and drawing, wherein one form of the invention is illustrated, it being understood that the invention is in no way limited by such description or drawing other than by the appended claim.

Referring to the drawing, wherein similar reference characters refer to like parts in the several views, Fig. 1 shows a side elevation, partially in section of a landing gear constructed in accordance with the principles of the present invention, Fig. 2 shows an elevation of the landing gear taken from the forward end of the airplane.

Referring more particularly to Fig. 1 of the drawing, an airplane wing 4 is indicated, and a suitable cylinder member 5, of the double acting type, is provided with trunnions 6, pivotally received by bearing members 7 suitably mounted on the frame work of the airplane. A piston member 8 is provided with a piston head 9 slidably mounted in the cylinder member 5, the lower portion of the member constituting a piston rod 10 having a forked extension 11 rigidly affixed to its lower end and suitably connected to an axle 12 on which a landing wheel 13 is rotatably mounted, the landing wheel being provided with a tire 14 as shown. A pair of suitable struts 15 are pivotally connected to the axle 12 at their lower ends as shown, and are pivotally connected at their upper ends by means of pins 16 to brackets 17 suitably attached to the frame work of the vehicle, the struts thus being adapted to rotate about the pins 16 in order to guide the positioning of the shock absorber members 5 and 8 during relative movement thereof, it being understood that during initial movement of the member 8 upward from the position shown, the corresponding movement of the wheel and tire will be in a more or less vertical direction, although the center of the axle 12 will actually describe a portion of an arc determined by the operation of the struts 15 and the positioning of the trunnions 6.

A cylindrical bore 18 is provided in the member 8 as shown, and a piston 19, carried on the lower end of a piston rod 20 attached to the upper end of the member 5 is slidably mounted in the cylinder, the piston rod 20 being adapted to slide in a bore 21 formed in the piston 9. The upper end of the bore 18 is connected with the interior of the cylinder member 5 by means of a restricted passage 22, and the interior of the cylinder 5 is also connected with the bore 18 by means of a restricted passage 23 formed in the piston rod 20, the interior of the member 5 therefore being connected with the portion of the bore 8 above the piston 19 by means of passage 22, and with a portion of the bore below the piston 19 by means of a passage 23.

The shock absorber comprising the members 5 and 8 is adapted to be operated and controlled by fluid pressure, and preferably by a compressible fluid stored in a reservoir 24 suitably mounted on the vehicle, this reservoir being supplied with compressed fluid by means of a suitable compressor, not shown. The reservoir is connected with the upper end of the member 5 by means of a conduit 25, conduit 26, a one-way check valve 27, a conduit 28, a three-way valve 29, to be more fully described hereinafter, a conduit 30, a conduit 31, and a flexible tube 32, the construction of the valve 29 being such that with operating handle 33 in the position shown, fluid pressure is supplied directly to the upper end of the cylinder member 5 through the means just described. The valve is also provided with an exhaust port 34, and the construction is such that on movement of the lever 33 to the right as indicated, communication is prevented between conduits 28 and 30, and is permitted between conduit 30 and the exhaust port 34, whereupon fluid pressure is exhausted from the upper end of the member 5 through the flexible tube 32, conduits 31 and 30, and the three-way valve 29. A second control valve 35, preferably having the same construction as the valve 29, is connected to the right end of the conduit 25 as shown, the right end of the valve being connected to the lower end of the cylinder member 5 below the piston 9 by means of a conduit 36, a flexible tube 37, and a conduit 38 mounted on the cylinder member. The valve 35 is provided with an operating lever 39 and an exhaust port 40, the lever 39 being connected with the lever 33 for simultaneous operation therewith by means of a link 41 connected to the lever 39 by means of a pin 42 and to the lever 33 by means of a pin 44. With the parts in the position shown, the valve 35, which is of well known conventional construction, is effective to prevent communication between conduits 25 and 36, and to establish communication between conduit 36 and the exhaust port 40, thus serving to connect the lower end of the cylinder member 5 below the piston 9 with the exhaust port 40 through the conduit 38, flexible tube 37 and conduit 36. Thus with the valve levers 33 and 39 in the position shown, compressed fluid is supplied to the upper end of the cylinder member 5 from the reservoir 24 to extend the member 8 to the position shown, and the lower end of the cylinder member 5 below the piston 9 is connected to atmosphere through the passages heretofore described and the valve 35. On movement of the valve levers to the right, the reverse action takes place, the upper end of the cylinder member being exhausted, and the lower end being supplied with fluid pressure from the reservoir to retract the member 8 in the cylinder. When this action occurs, the struts 15 rotate in a counterclockwise direction about the pivot pins 16, and the member 5 likewise rotates in the same direction on the trunnion 6, the bearings 7 being so spaced from the pivot pins 16 as to cause the shock absorber members, struts and landing wheel to assume the position shown within the framework of the vehicle shown in dotted lines when the member 8 is fully retracted.

With the valve levers maintained in the right hand position, the fluid pressure in the lower end of the cylinder 5 will tend to maintain the landing gear in the position shown in dotted lines, and in order to insure the maintenance of the landing gear in this position when retracted, the lower end of one of the struts 15 is provided with an extending lug 45 which is adapted when the landing gear is retracted to engage a latch member 46 connected as shown by a piston rod 47 to a piston 48 slidably mounted in a cylinder 49 mounted on the framework of the vehicle. A spring 50 serves to normally maintain the above assembly in the position shown, and on upward movement of the landing gear, the lug 45 moves the latch member 46 to the right, and after the lug passes above the latch member, the latter is moved back to the position shown by means of the spring, thus preventing downward movement of the landing gear in the event of failure of the fluid pressure supplied to the lower end of the cylinder 5.

Assuming that the landing gear has been retracted, movement of the valve levers to the position shown will again exhaust fluid pressure from the lower end of the cylinder 5 and supply fluid pressure to the upper end to extend the landing gear, and in order to effect automatic disengagement of the latch 46 to permit extension of the landing gear, conduit 30 is connected to the cylinder 49 at the left side of the piston 48, and the valve 29 therefore automatically acts to supply fluid pressure from the reservoir to the cylinder 49 to move the piston 48, the rod 47, and the latch 46 to the right in order to disengage the latch from the lug 45. A vent port 51 is provided at the right end of the cylinder to permit this action to occur.

With the landing gear fully extended as shown, it will be apparent that on engagement of the tire 14 with the ground or with an obstruction, the member 8 will be moved upward with respect to the member 5, and the fluid in the upper end of the cylinder 5 will be compressed in order to absorb the resulting shock. Since the reservoir 24 has a relatively large volume, it is undesirable to compress fluid from the cylinder into the reservoir during this type of operation, and the one way check valve 27 serves to prevent this action from occurring. In like manner, when the member 8 moves upward, the piston 19 in the bore 18 serves to compress fluid in the bore, and this fluid is transmitted to the cylinder 5 above the piston 21 through the restricted passage 23, which may be made of any suitable size to provide the desired cushioning action. When the shock has been absorbed, the member 8 has been moved outward again by the action of fluid pressure on the upper side of the piston 9, and in order to control the speed of outward movement of the member 8, the size of the restricted passage 22 is likewise so chosen as to retard the flow of fluid pressure from the bore 18 above the piston 19 into the upper end of the cylinder 5. Thus a shock absorber action is obtained which satisfactorily cushions the shocks imposed by landing of the airplane and by obstructions on the ground, and at the same time, the parts comprising the shock absorber are effective, under the control of the lever 13 and the valves 29 and 35 to extend or retract the entire landing gear within the frame work of the vehicle or to a substantially horizontal position at the will of the operator. At the same time, the mechanism is effective at all times to satisfactorily guide the movement of the various parts and to maintain the wheel or ground engaging device in proper alignment with the structure of the vehicle.

While one form of the invention has been illustrated and described in considerable detail, it will be understood by those skilled in the art that changes and modifications may be made without departing in any way with the spirit of the invention. Reference, will, therefore, be had to the appended claim for a definition of the limits of the invention.

What is claimed is:

A combined shock absorbing and retractable landing gear for a vehicle including a ground engaging device, a shock absorber for connecting said device and vehicle including a cylinder member and a piston member slidably mounted therein, means for connecting one of said members with the device, a pivotal connection between the other member and the vehicle, a source of compressed fluid, a valve movable to exhaust position to exhaust fluid from one end of the cylinder and movable to a charging position to connect said one end with the source to retract the device, a second valve movable to a charging position to connect the other end of the cylinder with the source to extend the device when the first valve is in exhaust position, and movable to another position to exhaust fluid from said other end of the cylinder when the first valve is in charging position, means connecting said valves to cause operation thereof in the aforementioned sequence, a connection between the source and the first valve, a connection between the source and the second valve and including means for preventing the flow of fluid from said other end of the cylinder to the source whereby fluid is compressed in said other end of the cylinder by the piston member to absorb shocks imparted to the device when the second valve is in charging position, and means for guiding movement of the device during shock absorbing movement of the piston in the cylinder and for moving said members about said pivotal connection to a substantially horizontal position within the vehicle when the cylinder is supplied with fluid from the source to fully retract the device, including a strut pivotally connected at one end with the device and having at its other end a pivotal connection with the vehicle spaced from the first named pivotal connection.

ROY S. SANFORD.

REFERENCES CITED

The following references are of record in the file of this patent:

UNITED STATES PATENTS

| Number | Name | Date |
|---|---|---|
| 1,757,687 | Silva, Jr. | May 6, 1930 |
| 1,768,696 | Laddon | July 1, 1930 |
| 1,981,856 | Downey | Nov. 27, 1934 |
| 2,003,885 | Hoekstra | June 4, 1935 |
| 2,285,330 | Dowden et al. | June 2, 1942 |
| 2,365,424 | Mercier | Dec. 19, 1944 |

FOREIGN PATENTS

| Number | Country | Date |
|---|---|---|
| 508,231 | Great Britain | June 28, 1939 |
| 643,579 | Germany | Apr. 12, 1937 |